United States Patent Office 3,317,432
Patented May 2, 1967

3,317,432
THORIUM OXIDE SOL
Guy B. Alexander and George W. Sears, Jr., Wilmington, Del., assignors to E. I. du Pont de Nemours and Company, Wilmington, Del., a corporation of Delaware
No Drawing. Filed June 2, 1959, Ser. No. 817,468
2 Claims. (Cl. 252—301.1)

This application is a continuation-in-part of our prior copending application Ser. No. 646,213, filed Mar. 15, 1957, now abandoned.

This invention is directed to concentrated, stable, low-surface thoria sols and to methods for preparing the same.

More particularly, this invention relates to stable thoria aquasols having a concentration of at least 50% $ThO_2$ by weight and containing particles with average diameters ranging from 10 to 100 millimicrons, such sol being stabilized with a monovalent acid to a pH in the range from about 2 to 5. These thoria aquasols are prepared by growing larger colloidal particles of thorium oxide from smaller particles having particle diameters not greater than 5 millimicrons. By the addition of thorium salt and anion exchange resin to starting sol particles under controlled conditions, the formation of larger particles is favored.

In order that the invention may be better understood, various aspects are treated separately. Because of its importance to the whole invention, the method of deionization and pH control is first discussed.

DEIONIZATION AND pH CONTROL

Deionization as the term is here used refers to the replacement of the anion of a thorium salt with the hydroxyl ion.

The preferred method of deionization involves addition of an anion exchange resin in the basic or hydroxyl form to the solution to be treated. During addition the solution is vigorously agitated to prevent excessive local deionization.

This method of deionization is preferred because it permits the control of deionization. Complete deionization causes the particles formed to become unstable and coagulate to form a precipitate.

Hence the normal procedure of passing the thorium salt solution through a bed of the resin cannot be used. In column deionization, unless repeated and very rapid passes are made, the first part of the effluent is practically completely deionized and the last part practically unchanged.

Any of the common anion exchange resins can be used for this reaction provided they have been treated with alkali to convert them to the hydroxyl form. Anion exchange resins are very well known in the art and are available in a variety of forms. Their composition and mode of use are fully described in the literature. Anion exchange resins are made, for example, as described in U.S. Patents 2,422,054, 2,438,230, 2,591,573, 2,591,574, 2,597,440, 2,597,494, 2,614,099, 2,631,999, 2,642,417, 2,670,334, 2,670,335, 2,683,124, 2,683,125, 2,687,382, 2,687,383, 2,689,832.

Two types of anion exchange resins which are preferred in the present invention are polystyrene quaternary amine resins and phenol formaldehyde polyamine resins. For example, any of the "Amberlite" IRA400, IRA401, IRA410, IRA411 (all polystyrene quaternary amine resins), IR45 (a polystyrene amine resin), or IR4B (a phenol formaldehyde polyamine resin), resins manufactured by the Rohm and Haas Co., or "Dowex" 1 (a styrene divinyl benzene copolymer resin containing quaternary groups), or 2 (a polystyrene quaternary amine resin) manufactured by the Dow Chemical Co. can be used for this purpose. These resins are of the quaternary amine type and have been particularly useful in the present invention although other anion exchange resins are also useful, as those of ordinary skill in the art will readily appreciate.

This increase in ability to deionize with increasing temperature is believed due to increased polymerization of the thoria through formation of Th—O—Th bonds. Thus, while at room temperature, each molecule contains only a few Th atoms, particles formed by deionization at 100° C. will contain as many as 100–150 Th atoms.

Since the pH of the solution is a measure of the extent of deionization, resin can be added continuously in small amounts while stirring the mixture until the pH rises to the desired value. The resin, some of which is not spent, is then filtered off to stop this reaction.

PREPARATION OF STARTING PARTICLES

The method here used to prepare thorium oxide starting particles is to treat an aqueous solution of a soluble thorium salt solution with an anion exchange resin in the hydroxyl form.

In preparing colloidal thoria, account must be taken of the fact that only a very few salts of thorium are soluble. The most important of these are the nitrate and the halides (except the fluoride). The halates such as the chlorate, bromate and iodate are also soluble, but are less readily available. Of the halides, both the bromide and iodide are unstable in the presence of strong light in the presence of which they decompose slowly to form free halogen. Thus, the only important soluble salts of thorium for preparing the colloidal thoria of this invention are the nitrate and the chloride.

But it is not necessary that a highly soluble thorium salt be used to form stable colloidal thoria because anion concentration can be held to a low level. Thus, such anions as the formate and the acetate can be used for applications in which the nitrate or chloride are undesirable. Divalent ions such as sulfate, on the other hand, are not to be desired since they have a pronounced coagulating effect on the sol. Trivalent ions such as phosphate are even less useful for the same reason.

It is preferred to use a low concentration of starting colloidal thoria for the growth process. Thorium ions have a strong tendency to copolymerize with the thorium ions in the surface layer of the colloidal particles. Because the thorium ion is tetra-functional, there is a tendency for particles to be bridged by the reactive thorium ions. The result is that the particles stick together and form aggregates. By decreasing the initial concentration of thorium ions, the tendency to aggregate is decreased because the number of interparticle collisions is minimized.

However, this bridging tendency decreases with increasing particle size, because of increased momentum as particles become larger. Thus, the rate of addition of thorium salt can increase as particle size increases.

Starting with a freshly deionized thorium salt in which the colloidal particles contain only a few thorium atoms, it is preferred to have the concentration very low—below 1% by weight of thoria. With particles of 2–3 millimicrons diameter or larger, the concentration can be increased as much as 10–20% by weight of thoria.

At room temperatures, anions can be removed by deionization until the pH reaches 3.8–4.0 without appreciable precipitation. This corresponds to a replacement by hydroxyl ions of about 60–70% of the anions originally present. For deionization at 100° C., no precipitation occurs until the pH rises to at least 5, provided the rate of deionization is very slow—at least over a period of from 6 to 8 hours. This corresponds to a replacement of about 95% of the anions without coagulation. The slow rate and high temperature are required to achieve this high pH because the condensation of $$Th-OH + Th-OH \rightarrow Th-O-Th + H_2O$$

takes place only at a slow rate even at elevated temperatures.

The rate of deionization is less critical for sols of larger particle size. In general, the larger the particle size, the more complete can be the deionization without loss in stability.

Particles larger than about 5 millimicrons in diameter cannot be grown by conventional methods. One such method is to heat under pressure a slurry of thorium hydroxide which contains varying amounts of nitric or hydrochloric acid. Such treatment readily peptizes the slurry to form aquasols of thoria. But it is not possible to increase the diameter of the ultimate particles of such sols beyond about 5 millimicrons. Varying pH, time or temperature invariably results in irreversible aggregation of the particles with the formation of coarse precipitates.

PREPARATION OF PRODUCTS

Particles of thoria having average diameters from 10–100 millimicrons are grown by a process of adding a soluble thorium salt and an anion exchange resin in the basic or hydroxyl form simultaneously to a heated colloidal solution of thorium hydroxide seed particles.

More particularly, in this step to dilute aquasol of colloidal thoria prepared as described above, there is added a water-soluble thorium salt at a rate not exceeding 1 millimole of salt per hour per 10 square meters of colloidal thoria surface areas in the aquasol. Simultaneously with the addition of such thorium salt, there is added an anion exchange resin in the hydroxyl form at a rate sufficient to maintain the pH in the mixture in the range between about 2 and 5. During the addition of these materials, the temperature of the reaction mixture is maintained in the range above 80° C. and below the boiling point of water, i.e., 100° C., and the electrolyte level of the reaction mixture is kept below 0.2 molar. The addition of the said thorium salt and said anion exchange resin in the hydroxyl form is continued until the colloidal particles of thoria in the reaction mixture have grown to a size in the range of from about 10–100 millimicrons. Process details will now be given.

After solution, salt anions are extracted by a resin leaving the thorium ions in a more basic solution. These thorium ions are then free to do one of two things: either they can polymerize with each other to form new colloidal particles of thorium oxide or they can copolymerize with existing colloidal particles of thorium oxide thereby increasing the size of these particles.

By proper regulation of concentration of starting sol particles, pH, temperature, electrolyte concentration and rate of addition of thorium salt and resin, copolymerization to form larger particles can be favored to the exclusion of the formation of new colloidal particles. Particle size of the product thus becomes largely a function of the ratio of soluble thorium salt to original colloidal thoria. Each of these factors will now be discussed, in turn, with the exception of the concentration of starting sol particles, which has been discussed above.

For optimum polymerization it is preferred to maintain the pH between 2 and 5. However, as the pH decreases below 3, the rate of particle growth decreases and monomer concentration (i.e., the concentration of thorium ions) increases. In effect, the probability of new colloidal particle formation has been increased. Also, as the pH is increased to 4 and above, the efficiency of deionization, or replacement thorium salt anion with hydroxy ion by the anion exchange resin, decreases.

Consequently, a more preferred range of pH for this reaction is from 3 to 4. The most preferred range is 3 to 3.3.

Temperature affects the rate of copolymerization. Thus, to effect particle growth at room temperature requires very slow addition of the thorium salt. Above 100° C., pressure reactors and feed systems are required. However, most anion exchange resins are unstable at such elevated temperatures. The result is that a resin loss occurs together with thoria sol contamination from decomposition products. It is therefore preferred to operate the process at 80–100° C. using atmospheric pressure. While one can use pressure reactors and feed systems, as a matter of convenience, one will usually prefer to use atmospheric pressure conditions and temperatures in the range of from about 80–100° C.

Electrolyte concentration also affects the rate of copolymerization. For this reason it is desirable to have a low concentration of a salt like sodium nitrate or the like present during the copolymerization. But sol stability decreases with increasing electrolyte level because it causes a reduction in the electric potential of the colloid particle. Therefore, the electrolyte level must be kept at least below 0.2 molar and preferably below 0.1 molar, during the copolymerization. For maximum stability of the final product, this electrolyte should be removed by deionization before concentrating the sole as described later.

The rate of addition of soluble thorium salt is governed by the rate of copolymerization of thorium ions with colloidal thoria particles. A high concentration of partly deionized thorium salt not only tends to induce formation of new colloidal particles but also tends to cause aggregation of the existing colloidal particles.

In effect, the desired reaction is one between the partly neutralized thorium salt and the surface groups of the colloidal particles. Presumably, a condensation of :Th—OH in solution with :Th—OH on the particle surface forming :Th—O—Th: + $H_2O$ occurs. Thus, the over-all rate of reaction increases with the amount of colloidal surface exposed.

It is preferred to hold the rate of addition to less than about 1 millimole per hour per 10 square meters of colloid particle surface for reactions carried out at 100° C. If the initial colloidal particles are very small as in freshly deionized thorium salt solution, the exposed surface area is not accurately known. It is preferred, however, in this situation to add the thorium salt solution at a rate less than 15 millimoles per hour per millimole of thorium in the colloid. This rate can then be increased as the colloid surface increases.

The rate of increase of total surface area can be calculated from the fact that the total surface increases with the two-thirds power of the total mass present. The total mass is equal to the sum of the mass of thorium oxide present in the original colloid plus the mass of thorium oxide added as thorium salt.

Rates considerably faster than those stated above can be used, but the products obtained will generally contain aggregates and single particles of more widely varying particle size than will be obtained if slower rates are used.

The rate of addition of anion exchange resin is determined completely by the rate of addition of the thorium salt and the pH of the reaction mixture. In practice, the resin will be added at a rate just sufficient to hold the pH at the desired level, after having fixed all other variables of the process.

CONCENTRATION OF THE PRODUCT SOL

Although, as above stated, the starting colloid of thoria is generally very dilute, considerable concentration can be expected during copolymerization by using a concentrated solution of the thorium salt.

For this purpose, a 1 to 2 molar solution of thorium salt is preferred. In addition, a portion of the water of the system can be evaporated or boiled off during copolymerization. Evaporation can be used to hold the volume of the colloidal solution constant during the reaction. By such means, sols of 10-30% thoria can be prepared directly.

Once the large particles of colloidal thoria have been grown and little, if any, low molecular weight thoria is left, the particles are remrakably inert toward each other. This inertness toward each other holds true so long as the pH of the sol is held on the acid side (i.e., in the range of from about 2 to 5) and free electrolyte is held to a minimum concentration.

Such sols are readily concentrated by direct boildown to very high concentrations.

The maximum concentration of any such sol is about 50% by volume, or about 90% by weight. At this point, the particles are essentially in contact with their nearest neighbors, and the sol loses its fluidity and becomes a paste.

This maximum concentration decreases with increasing aggregation or porosity of the particle. Such maximum concentration also decreases with decreasing particle diameter because of the increasing importance of the surface hydroxyl layer and the outer double layer containing the negative counter ions. Nevertheless, sols containing considerable aggregation and particle heterogeneity can readily be boiled down in open containers to at least 60-70% thoria by weight without serious loss in fluidity.

In general, boil-down causes concentration not only of the sol particle, but also of the free acid in the sol. This acid must be removed during or after boil-down to maintain the pH preferably between 3 and 4. Such pH control merely involves treatment with the same type of anion exchange resin used during the polymerization process. The resin is stirred with the sol until the pH increases to the desired level, and then is filtered off.

STABILITY OF THE PRODUCT SOL

The stability of the colloidal thoria particles is due at least in part to the charge on these particles. The more highly charged the particles become the more they repel each other and the less likely they are to coagulate or gel.

In acid medium thoria is positively charged, due either to adsorption of protons or free thorium ions. In order to maintain complete electrical neutrality, negatively charged ions must be present in amounts equivalent to the positively charged ions on the colloid surface. Such negatively charged ions are found in a more or less diffuse layer surrounding each particle.

In the absense of added electrolyte, the total anion content of the sol, less the free acid present as determined by pH, is a measure of the total charge on the colloid surface. Stability of the sol is due primarily not to total charge but to charge per unit area. Therefore, the corrected anion content divided by the surface area of the colloid gives a measure of the stability of the sol. The anion content is conveniently given by the molar ratio $(ThO_2/X)$ where X represents the anion, such as nitrate or chloride.

The minimum anion concentration for stable sols can be defined by the following equation:

(1) $$RA = 6250$$

where $R$ is the molar ratio of thoria to anion and $A$ is the specific surface area of the colloidal particles in square meters per gram.

Assuming that the colloidal particles of thoria are either cubes or spheres of unit edge or diameter respectively equal to $D$ and taking the average density equal to 9.2 grams per cubic centimeter, it can be calculated from geometry that (2) $$AD = 650$$

where $D$ is measured in millimicrons.

Thus, sols of 10 millimicron particles are stable up to a ratio of 96 and sols of 100 millimicron particles are stable up to a ratio of 960.

The minimum ratio which defines the maximum anion concentration depends partly on the use to which the sol will be put. In general, a sol will increase in usefulness with decreasing anion content or acidity. For practical purposes, therefore, ratios greater than unity are preferred.

THE PRODUCTS

As indicated above, the products of this invention are highly pure, stable aquasols of thoria containing particles of average diameter from 10-100 millimicrons. The aquasols have a concentration of at least 50% of thorium dioxide by weight of thorium dioxide. Thoria aquasols prepared according to the teachings of the invention have been prepared having a concentration of thoria in excess of about 80% by weight and it is believed that aquasols having a concentration of greater than 95% can be prepared in accordance with the teachings of the invention. These aquasols are stabilized with a monovalent acid so as to have a pH in the range from about 2 to 5.

The sols are positively charged. These monovalent acids which have been used in stabilizing the aquasols against aggregation preferably have dissociation constants greater than about 0.1 at 25° C. Such acids include nitric acid, hydrochloric acid, trichloroacetic acid, hydrobromic acid, iodic, chloric, perchloric and the like.

In special cases, a sol prepared from the thorium salt of such an acid might be treated with an anion exchange resin in order to replace the acid with another of lower dissociation such as the formic or acetic.

The sols owe their stability to the fact that their particles average at least 10 millimicrons in diameter, therefore, they are much less reactive toward aggregation or gelation than the very small particles of the prior art. Additionally, they contain a lower concentration of stabilizing acid because of the reduced absorption of the lower surface area of the particles.

It is probable that the actual particle densities in sols prepared from $Th(OH)_4$ and $ThO_2$ are quite different. The density of massive $ThO_2$ is 9.7, which indicates that the density of colloidal particles can possibly be greater than 8. Since the density of $Th(OH)_4$ is about 5.3, a highly hydrated particle can possible have a density only half that of the oxide. The settling tendency of $Th(OH)_4$ and $ThO_2$ particles will be quite different and in each case much more severe than is the case, for example, with boehmite.

Particles larger than about 50 millimicrons can be expected to settle quite rapidly.

UTILITY

The stable, concentrated colloidal solutions of thoria of this invention find use in many fields of which the following are exemplary:

(1) Thoria sols have been used for many years as a contrast medium for radiological diagnosis. Such sols are suspected of having carcinogenic properties. The larger particles of this invention form sols of greater stability with less likelihood of precipitation with the organ under examination.

(2) The particles of this invention are useful as anti-soil agents and may be applied in a suitable vehicle to painted surfaces, wallpaper and the like. Particularly favored as a vehicle for the colloidal thoria of this invention are waxes containing the colloidal thoria in suspension. Depending on the wax used such compositions are capable of giving high gloss products.

(3) These materials are also useful in preparing dense refractory bodies of thoria. Such bodies are made by incorporating the thoria sol with thoria grain, then drying and fusing the resulting mixture.

(4) Use as a fuel in homogeneous breeder reactors, or reactors in which the fuel is converted from nonfissionable form to a fissionable form. $Th^{232}$ absorbs a neutron forming $Th^{233}$. This product then emits 2 beta particles giving $U^{233}$, which is one of the two fissionable isotopes of uranium, $U^{235}$ being the naturally occurring fissionable isotopes. A breeder reactor contains a source of neutrons, usually uranium enriched with $U^{235}$.

On fission, the $U^{235}$ atoms release high energy neutrons. These are slowed down by passage through a moderator until they are of sufficiently low energy to be captured by the thorium atoms. After being slowed down they are called thermal neutrons because their original energy has been dissipated by collision with moderator atoms leaving only their thermal energy left.

The thorium can be present as metal bars embedded in graphite, in which case the carbon atoms act as the moderator. In a homogeneous reactor, the thorium is in fine suspension as the oxide, or in solution, as, for example, the nitrate. High concentrations of nitrate are undesirable, however, because $N^{14}$, the common isotope of nitrogen also captures neutrons, thus reducing reaction efficiency. Either water or heavy water is commonly used as a moderator.

The thoria aquasols of this invention are advantageously used in homogeneous breeder reactors for a number of reasons. These sols have stability of suspension, high fluidity, and low abrasiveness, as contrasted with noncolloidal thoria suspensions. Higher concentrations of thoria are obtainable than in any other fluid medium. There is a lower concentration of all other atoms, except oxygen, than in any other thorium-containing system. These thoria sols are not as corrosive as compared with thorium salts or small particle sols.

The following non-limitative examples illustrate various forms of the invention. While "Dowex" 2 and "Amberlite" 4B have specifically been used for purposes of illustration in these examples, it will be readily understood by those having ordinary skill in the art that other suitably-prepared anion exchange resins are useful interchangeably with those instantly employed.

*Example 1*

For the preparation of large colloidal particles of thorium oxide, nuclei for the polymerization were first formed by addition of 5.7 ml. of a 1 molar solution of thorium nitrate to 3 liters of boiling water. The pH of this solution was adjusted to pH 3.2 by addition of "Dowex" 2 anion exchange resin in the hydroxyl form and the solution was held at these conditions for 20 minutes.

A. 1.0 molar solution of thorium nitrate was then added to the rapidly stirred boiling mixture at a rate of 6.33 ml. per minute until a total of 108.3 ml. had been added. Simultaneously with this addition, further additions of the "Dowex" 2 resin were made in order to maintain the pH, measured at room temperature, at 3.2. The opalescent colloidal solution was then filtered to remove the "Dowex" 2 resin, and the solution was boiled down in a series of open containers until the volume of the sol was about 16 ml. During the evaporation the pH of the sol was increased twice by partial deionization. When the sol volume was reduced to 200 ml. the pH was increased with "Dowex" 2 resin from 3.0 to 3.5, and at a volume of about 50 ml. the pH was again increased from 2.75 to 3.5. Each time the resin used was rinsed into the sol to prevent loss of thoria.

The sol was found to contain 64% $ThO_2$, and its viscosity was 14.4 centistokes. The pH of this sol was 3.4 and had a mol ratio $ThO_2/HNO_3 = 10$. An electron micrograph showed spheroidal particles of about 20 millimicron average diameter. This sol showed no change in viscosity on standing at room temperature for four months. Thus, the sol is stable.

Resins useful interchangeably with "Dowex" 2 include "Amberlite" resins IRA400, IRA401, IRA410 and IRA411, IR45, and IR4B, "Dowex."

*Example 2*

To 3 liters of boiling water were added 11.4 ml. of a 1.0 M solution of thorium nitrate and sufficient "Dowex" 2 anion exchange resin in the hydroxyl form to maintain the pH at 3.2. After 20 minutes, 102.6 ml. of 1.0 M thorium nitrate was added at a constant rate over a period of 162 minutes to the vigorously agitated boiling mixture. Throughout this period of addition, the pH was held constant at 3.2 by periodic addition of more "Dowex" 2 resin. After all the thorium nitrate had been added, the opalescent sol was filtered to remove the anion exchange resin and then boiled down to a volume of about 200 ml. The sol was then treated with "Dowex" 2 to increase the pH from 2.65 to 3.5 and the resin filtered and washed to prevent loss of thoria. Boil-down was continued until the sol had a volume of about 75 ml. Deionization was repeated as described above to increase the pH from 2.85 to 3.5 and the sol boiled down to a final volume of about 14 ml.

The nearly clear amber-colored sol was found to contain 66.6% of $ThO_2$ and had a viscosity of about 1000 centistokes. Its pH was 3.2. An electron micrograph showed the particles to be spheroidal and of about 15 millimicron average diameter. The mol ratio $ThO_2/HNO_3$ of this sol was 4.3.

"Dowex" 1 is useful interchangeably with "Dowex" 2.

*Example 3*

To 3 liters of boiling water were added 22.8 ml. 1 M thorium nitrate solution and sufficient "Dowex" 2 anion exchange resin in the hydroxyl form to maintain the pH at 3.4. After maintaining the boiling solution at constant pH for 20 minutes, 91.2 ml. 1.0 M thorium nitrate solution was added to the boiling mixture at constant rate and with vigorous agitation over a period of 144 minutes, while maintaining the pH constant at 3.2 with periodic additions of "Dowex" 2 resin. During this addition, the sol became somewhat opalescent as the size of the particles increased. The sol was filtered after all the thorium nitrate had been added, and then boiled down to a volume of about 150 ml. The sol was then treated with "Dowex" 2 resin to raise the pH from 2.5 to 3.5. After removal of the resin by filtration and rinsing the resin to prevent loss of thoria, boil-down was continued until the sol volume was about 50 ml. Resin treatment was repeated to raise the pH from 2.6 to 3.5. Evaporation was continued as before, until the volume of the sol was about 14 ml.

The sol was analyzed to contain 62.1% $ThO_2$ and to have a pH of 2.8. The mol ratio $ThO_2/HNO_3 = 2.9$. Its viscosity was 12.8 centistokes. An electron micrograph of the sol showed the particles to be spheroidal and to have an average diameter of about 12 millimicrons. This sol is stable as shown by the fact that it is stable on storage for four months at room temperature.

A portion of this sol was treated with anion exchange resin, whereupon the pH rose to 4.5.

*Example 4*

To 3.0 liters of boiling water was added 15.0 ml. of 1.0 M thorium nitrate solution. Boiling was continued for one hour at constant volume and the pH was maintained at 3.1–3.2 by periodic addition of "Dowex" 2 anion exchange resin. To this mixture, held at 100° C. and at pH 3.1 by means of further addition of "Dowex" 2 resin, was added with vigorous agitation 900 ml. of 0.10 M thorium nitrate at a rate of 300 ml. per hour. The opalescent colloidal solution was filtered and cooled. At this point it contained 1.1% $ThO_2$.

Polymerization was then continued, using these colloidal particles as nuclei. To 2220 ml. of this 1.1% $ThO_2$ sol at 100° C., were added with rapid agitation 900 ml. of 0.20 M thorium nitrate solution and sufficient "Dowex" 2 resin to maintain the pH at 3.1. The time of addition was 3 hours. The nearly milk-white sol was then filtered and evaporated by direct boil-down to about 120 ml. The pH of the sol was increased at this point with "Dowex" 2 resin from 2.5 to 3.6, and evaporation was continued under reduced pressure with good agitation to about 32 ml.

The somewhat viscous sol contained 74% ThO$_2$, and an electron micrograph showed the spheroidal particles to have an average diameter of 42 millimicrons. The pH of this sol was 3.1 and the ThO$_2$/HNO$_3$ mol ratio was 4.0.

*Example 5*

A dilute colloidal solution of thoria is prepared according to Example 4. An amount of this sol containing 70 g. ThO$_2$ consisting of particles about 40 millimicrons in diameter is evaporated by direct boil-down to 250 ml. The sol at this point is treated with "Dowex" 2 resin to increase the pH to 3.9, and boil-down is continued until the sol volume is 70 ml. The sol is again cooled and treated with "Dowex" 2 to increase the pH to 4.1. The sol is then boiled down with stirring, as before, to the final volume of 40 ml.

This fluid sol contains 68% ThO$_2$ and is composed of spheroidal particles of average diameter of about 42 millimicrons. The pH of the sol is 4.0 and the ThO$_2$/HNO$_3$ mol ratio is 36.

*Example 6*

To 3.0 liters of boiling water is added 0.23 ml. 1.0 M nitrate solution. After continuing the boiling for 20 minutes, 114 ml. 1.0 M thorium nitrate is added to the rapidly stirred boiling solution at a rate of 19 ml. per hour while maintaining the pH at 2.9–3.0 by periodic addition of "Amberlite" IR4B anion exchange resin in the hydroxyl form. The resin is then filtered off and rinsed into the sol to prevent loss of thoria.

This sol contains 1.0% ThO$_2$ and the average particle diameter as determined from electron micrograph is about 24 millimicrons.

One liter of this sol is diluted to 6.0 liters with distilled water, heated to boiling, and with rapid agitation 380 ml. of 1.0 M thorium nitrate is added at a rate of 54 ml. per hour, the pH being maintained at 2.9–3.0 by periodic addition of "Amberlite" IR4B resin. At the end of the addition of thorium nitrate solution, the sol is filtered and boiled down by direct evaporation to 300 ml. The pH is increased to 3.1 by treatment with "Amberlite" IR4B, the sol filtered and resin rinsed into the sol, and evaporation continued until the sol volume is reduced to about 100 ml. Deionization to pH 3.1 is again carried out as described above and the sol is finally boiled down to about 58 ml.

This opaque sol contains 72% ThO$_2$ and contains spheroidal particles the average diameter of which, as determined by electron micrograph, is 55 millimicrons.

*Example 7*

To 3.0 liters of boiling water is added 5.7 ml. of a 1.0 M solution of thorium chloride. The pH of this solution is adjusted to 3.3 by addition of "Dowex" 2 anion exchange resin in the hydroxyl form and the solution maintained at these conditions for 20 minutes. 108.3 ml. of a 1.0 M solution of thorium chloride is now added to the rapidly stirred boiling solution at a rate of 38 ml. per hour. The pH is maintained at 3.3 by periodic addition of the "Dowex" 2 resin. The opalescent colloidal solution is filtered to remove the spent resin, and the resin rinsed into the sol to prevent loss of thoria.

The solution is boiled down directly by heating in a beaker on a hot plate, vigorous agitation being continuously applied, until the volume reaches 175 ml. The pH is then increased from 2.9 to 3.5 by treatment with "Dowex" 2 resin, and boil-down continued until the volume reaches 60 ml. Deionization to pH 3.5 is again carried out and the sol is finally boiled down to a volume of about 17 ml.

This sol contains 60% ThO$_2$, has a viscosity of 13 centistokes and contains particles of average diameter as determined by electron micrograph of 21 millimicrons.

What is claimed is:

1. In a process for preparing thoria aquasols which are stabilized with a monovalent acid to a pH in the range of from about 2 to 5 and which have a concentration of from about 50 to 81 weight percent of thorium dioxide in the form of particles having an average diameter ranging from about 10 to 100 millimicrons, the step of simultaneously adding to a dilute aqueous solution of colloidal thoria particles having particle diameters not greater than 5 millimicrons a water-soluble thorium salt at a rate not exceeding 1 millimole of salt per hour per 10 square meters of colloidal thoria surface area in the colloidal solution, and an anion exchange resin in the hydroxyl form at a rate sufficient to maintain the pH in the mixture in the range between 2 and 5, while maintaining a temperature in the range above 80° C., and an electrolyte level below 0.2 molar in the reaction vessel, the additions being continued until the colloidal particles of thoria in the system have grown to a size in the range from about 10 to 100 millimicrons.

2. A stable thorium oxide sol having an average thorium oxide particle diameter size in the range of about 10 to 100 millimicrons, said sol being at a pH of between about 3 to 5.

References Cited by the Examiner

UNITED STATES PATENTS

| | | | |
|---|---|---|---|
| 2,285,477 | 6/1942 | White | 252—313 |
| 2,438,230 | 3/1948 | Ryznar | 252—313 |
| 2,577,485 | 12/1951 | Rule | 252—313 |
| 2,733,205 | 1/1956 | Dalton et al. | 252—313 X |
| 2,824,784 | 2/1958 | Hansen et al. | 23—14.5 |

FOREIGN PATENTS 379,133   8/1932   Great Britain.

OTHER REFERENCES

Dobry et al.: "J. de chimie physique," vol. 50, pp. 501–506 (1953).

Thomas et al.: "J.A.C.S.," vol. 57, pp. 1821–1825 (1935).

TID–3044 (Suppl. No. 1), pp. 87, 88, and 93, June 1955.

Weiser: "The Hydrous Oxides," pp. 246–50 (1926), McGraw-Hill Book Co., Inc., New York, N.Y.

CARL D. QUARFORTH, *Primary Examiner.*

J. GREENWALD, *Examiner.*

R. D. LOVERING, J. D. VOIGHT, L. A. SEBASTIAN,
*Assistant Examiners.*